United States Patent [19]

Woyciesjes

[11] Patent Number: 5,000,866
[45] Date of Patent: Mar. 19, 1991

[54] ANTIFREEZE COMPOSITIONS CONTAINING ALKANE TETRACARBOXYLIC ACID FOR USE WITH HARD WATER

[75] Inventor: Peter M. Woyciesjes, Woodbury, Conn.

[73] Assignee: First Brands Corporation, Danbury, Conn.

[21] Appl. No.: 499,132

[22] Filed: Mar. 26, 1990

[51] Int. Cl.⁵ ................................................. C09K 5/00
[52] U.S. Cl. ...................................... 252/78.3; 252/79
[58] Field of Search ................ 252/78.3, 79, 387, 388, 252/389.3, 389.31

[56] References Cited
U.S. PATENT DOCUMENTS

| | | | |
|---|---|---|---|
| 2,529,177 | 11/1950 | Nieland et al. | 252/79 |
| 4,382,008 | 5/1983 | Boreland et al. | 252/79 |
| 4,561,990 | 12/1983 | Darden | 252/79 |
| 4,578,205 | 3/1986 | Yeakey et al. | 252/79 |
| 4,588,513 | 5/1986 | Triebel et al. | 252/79 |
| 4,592,853 | 6/1986 | Darden et al. | 252/79 |

Primary Examiner—Paul Lieberman
Assistant Examiner—William S. Parks
Attorney, Agent, or Firm—Gary L. Wamer

[57] ABSTRACT

An antifreeze concentrate comprising an alcohol, buffer, silicate, and a silicate protecting agent comprising an alkane tetracarboxylic acid, preferably a 1, 2, 3, 4-alkane tetracarboxylic acid, and derivative thereof. The antifreeze concentrate may suitably be diluted with from about 10% to about 90% by weight of water based upon the weight of the concentrate, wherein the water may contain hard water cations without significant loss of soluble silicate species. The aqueous antifreeze compositions have particular utility as a composition for heat exchange systems, for example, those employed with internal combustion engines.

36 Claims, 2 Drawing Sheets

SILICATE SOLUBILITY DURING AI DISC TEST (1) Antifreeze with ASTM water
(2) Antifreeze + BTCA with ASTM water
(3) Antifreeze with ASTM/Ca$^{+2}$ water
(4) Antifreeze + BTCA with ASTM/Ca$^{+2}$ water

ANTIFREEZE COMPOSITIONS CONTAINING ALKANE TETRACARBOXYLIC ACID FOR USE WITH HARD WATER

FIELD OF THE INVENTION

This invention relates to corrosion-inhibitive heat transfer compositions, e.g., antifreeze compositions, comprising an alcohol, a water soluble silicate and silicate stabilizing agent comprising an alkane tetrocarboxylic acid, e.g., 1, 2, 3, 4-alkane tetracarboxylic acids, and derivatives thereof. The compositions are advantageous in preparing working antifreeze compositions when diluted with water containing hard water cations.

DESCRIPTION OF THE PRIOR ART

Corrosion-inhibitive heat transfer compositions of aqueous alcohol solutions have widely been employed in heat exchange systems associated with internal combustion engines, solar systems, and the like, to depress the freezing point of the coolant water, to raise its boiling point, and provide corrosion protection.

The prior art has proposed numerous corrosion-inhibitive heat transfer compositions based on alcohols and employing numerous corrosion inhibitors. Various organic and inorganic corrosion inhibitors have been employed. Among the organic materials which have been utilized in such corrosion-inhibitive heat transfer compositions are the following: guanidine, citrates, coal tar derivatives, petroleum bases, thiocyanates, peptones, phenols, thioureas, tanin, quinoline, morpholine, triethanolamine, tartrates, glycol monoricinoleate, organic nitrites, mercaptans, organic oils, sulfonated hydrocarbons, dicarboxylic acids, fatty oils and soaps. Among the inorganic materials which have been employed as inhibitors are sulfates, sulfides, nitrates, fluorides, hydrogen peroxide, alkali metal chromates, nitrites, phosphates, borates, tungstates, molybdates, carbonates, and silicates and alkaline earth metal borates.

Although the prior art has extensively dealt with the corrosion aspects of the numerous components in the antifreeze compositions, one important aspect of the working antifreeze composition has not been carefully considered. This important aspect relates to the relationship of the corrosion-preventing properties of the working antifreeze composition as a function of the impurities in the water with which the antifreeze concentrate is diluted to form the working antifreeze. Since a working antifreeze typically contains between 30 and 70 weight percent water, the effects of the naturally occurring impurities in the water are extremely important in the performance of the working antifreeze composition.

One of the common occurrences in ground water is the presence of a significant concentration of mineral salts. The presence of dissolved mineral salts in water is generally described as the "hardness" of water and is the result of many factors. Although several factors contribute to the hardness of water, the hardness of water is generally considered to mean the total concentration (parts per million (ppm)) of calcium and magnesium ions. Hardness is generally expressed in terms of the equivalent amount of calcium carbonate in grains per gallon (g.P.g.), where one grain per gallon equals 17.1 parts per million (ppm) as $CaCO_3$ Total Hardness. "Hard Water" is traditionally defined as water having greater than about 120 ppm as $CaCO_3$ Total Hardness (See: "Public Water Supplies of the 100 Largest Cities in The United States, 1962", by Charles N. Durfor and Edith Becker, U. S. Geological Survey, 1965; at pages 27 and 28), although water containing at least 100 ppm $CaCO_3$ Total Hardness is typically considered "hard water" when employed to form a working antifreeze.

The effect of hard water on silicate in silicate-containing antifreeze compositions has not been widely considered. In many, if not most, prior art antifreeze compositions a phosphate is present to function as a species that associates itself with hard water cations. The phosphate serves to protect the silicate species from attack by hard water cations present in the working antifreeze. An interesting approach to the problem of hard water effects is disclosed in European Patent Application No. 86308892.8. The European Application discloses the use of a precipitation-inhibiting compound for an alkali metal silicate corrosion inhibitor where the precipitation-inhibiting compound is selected from the group consisting of:

(i) a hydrocarbyl aminophosphonic acid and/or alkali metal aminophosphate salt or a mixture thereof, having the formula where R is a substituted or unsubstituted alkylene radical having up to 12 carbon atoms, $X_1$ is a hydrogen atom or a hydroxyl, amino, $—PO(OH)_2$ or $—N[—R—PO(OH)_2]_2$ group, and $X_2$ and $X_3$ are $PO(OH)_2$ or $—N[R—PO(OH)_2]_2$ groups;

(ii) a phosphino polycarboxylic acid and/or alkali metal phosphino polycarboxylate salt or a mixture thereof, having the formula:

where m+n has a value from 2 to 20 and the molecular weight lies in the range 200–2000; and (iii) a polyacrylic acid and/or alkali metal polyacrylate salt or a mixture thereof, the polyacrylic acid having a molecular weight in the range 1000 to 10,000.

European Application No. 86308892.8 does not disclose any reason for requiring the use of phosphorus-containing or high molecular weight polymers as the precipitation inhibiting compounds or suggest what other compounds, if any, may be useful in providing a stabilizing effect for silicate.

The use of numerous dicarboxylic acids as corrosion inhibitors is well known in the patent literature. For example, U.S. Pat. No. 2,726,215 discloses a method for reducing the corrosion of metals in contact with aqueous solutions by addition of a salt of sebacic and/or azelaic acid to the aqueous solution. Numerous patents have issued in recent years where a dibasic carboxylic acid or its salt have been employed as corrosion inhibiting components in antifreeze compositions. These patents disclose various complex mixtures wherein a dicarboxylic acid or salt thereof is present as a corrosion inhibitor component. In each instance, the dicarboxylic acid or salt has been disclosed for its corrosion inhibition characteristics. Patents representative of the use of selected dicarboxylic acids as corrosion inhibitors include: U.S. Pat. No. 2,529,177 (non-silicate-containing composition containing hydroxy polycarbonate having no more than six carbon atoms; a tricarboxylic acid is disclosed in a non-silicate composition); U.S. Pat. No. 4,382,008 ($C_7$ to $C_{13}$ dibasic acid); U.S. Pat. No. 4,561,990 (dicarboxylic acid having 8 to 12 carbon atoms with an alkali metal molybdate); U.S. Pat. No. 4,578,205 (methylene azelaic acid); U.S. Pat. No. 4,578,028 (alkali metal salt of a dicarboxylic acid in a non-silicate antifreeze); U.S. Pat. No. 4,588,513 (dicarboxylic acid in a non-borate, non-phosphate antifreeze); and U.S. Pat. No. 4,592,853 (dicyclopentadiene dicarboxylic acid salts).

Although, as above discussed, a large number of patents have dealt with the corrosion inhibiting characteristics of numerous dicarboxylic acids and/or their salts, these patents have not considered the relationship, if any, of these dicarboxylic acids and/or salts to the performance of the antifreeze composition in relation to the hardness of the water employed to prepare the working antifreeze. Further, these patents have for the most part been narrowly limited to dicarboxylic acids.

Surprisingly, it has been found that an alkane tetracarboxylic acid, preferably a 1, 2, 3, 4-alkane tetracarboxylic acid, while not necessarily providing corrosion inhibiting properties themselves are most beneficial in preventing the negative effect of hard water on the soluble silicate species of silicate-containing antifreeze compositions and, further, and quite unexpectedly, are not themselves corrosive to the metals present in automotive cooling systems. The use of alkane tetracarboxylic acid, esters, anhydrides and salts of the acids, esters and anhydrides have been found to provide protection for soluble silicate species against cations present in water. Cations present in water have been found to react with the soluble silicate component of a silicate-containing antifreeze and result in a decrease in the overall corrosion inhibiting capacity of the silicate-containing antifreeze. Accordingly, the instant invention improves the performance of the antifreeze composition by decreasing the amount of soluble silicate that is rendered inactive by the hardness of the water, i.e., cations contained in the water, employed to produce the antifreeze concentrate and/or the working antifreeze.

Accordingly, the instant invention provides an improved corrosion-inhibitive heat transfer composition, i.e., antifreeze, comprising alcohol, silicate and an alkane tetracarboxylic acid (and derivatives thereof), which is characterized by improved corrosion inhibition when employed in aqueous cooling systems containing hard water, such as employed for introduction into automotive cooling systems.

SUMMARY OF THE INVENTION

This invention relates to an improved corrosion-inhibitive heat transfer, i.e., antifreeze, composition concentrate comprising:

(a) an alcohol;

(b) a buffer in an amount to maintain a selected pH for the antifreeze;

(c) a silicate in an effective corrosion-inhibiting amount; and (d) a silicate-protecting agent in an effective silicate-protecting amount of an alkane tetracarboxylic acid, preferably selected from the group consisting of 1, 2, 3, 4-alkane tetracarboxylic acid, salts of 1, 2, 3, 4-alkane tetracarboxylic acids, the esters and anhydrides of the 1,2,3,4-alkane tetracarboxylic acids, salts of the esters and anhydrides of the 1, 2, 3, 4-alkane tetracarboxylic acids and mixtures thereof.

Further, the invention relates to a working antifreeze formed using the above antifreeze concentrate in admixture with 10 to 90% by weight water containing hard water cations, e.g., at least 50 ppm $CaCO_3$ Total Hardness. In addition to the above components, the antifreeze concentrate may contain heretofore employed compounds useful for silicate stabilization in antifreeze compositions, e.g., siloxanes, as hereinafter described.

DESCRIPTION OF THE INVENTION

The complexities of the problems associated with silicate-containing antifreeze compositions are complex and still in the process of delineation by those skilled in the art. One of the known critical parameters in silicate-containing antifreeze compositions for effecting the required corrosion inhibition of metal surfaces is the presence of soluble silicate species in the working antifreeze composition. The term "antifreeze" is employed herein in its commonly used industry meaning as referring to heat transfer compositions suitable as a heating or cooling heat transfer compositions and is not intended to limit the use of such compositions.

A significant segment of the technology over the last twenty years in the antifreeze area has related to various means for improving or maintaining the solubilization of silicate species in the working antifreeze. Two U.S. Patents are particularly noteworthy of this technology. U.S. Pat. Nos. 3,341,469 and 3,337,496 disclose an aqueous alcohol composition employing siloxane-silicate copolymers where the siloxane can contain polyethyleneoxy organosilicon species. Although other patents deal with the problem of silicate stabilization, the common issue in such patents relates to stabilization of silicate to provide silicate gel resistant composition concentrates.

The extensive prior art relating to stabilization of the soluble silicate species has in general not dealt with the different stabilization issues associated with soluble silicate species in the working antifreeze, i.e., the water-diluted antifreeze concentrate. One recent patent discussing the stability of the silicate component in the concentrate and the working antifreeze is U.S. Pat. No. 4,701,277, wherein a silicate-containing antifreeze is disclosed with a carboxy-substituted organosilicon stabilizer. The carboxy-substituted organosilicon stabilizer provides both an antifreeze concentrate and working antifreeze with improved stability against gelation and improved resistant to the formation of insoluble silicate species in the working antifreeze. The patentee recognized that many silicone stabilizers were appropriate in the concentrate but actually appeared to destabilize the silicate in the water-diluted antifreeze, i.e., the working antifreeze.

The instant invention supplements the prior art by providing an additional mechanism by which the corrosion-inhibiting soluble silicate component may be maintained in the antifreeze composition concentrate and/or working antifreeze in an effective corrosion-inhibiting amount. As above discussed, maintaining the silicate as a soluble species is often difficult in the working antifreeze compositions, since such are generally formed with water containing dissolved mineral salts which tend to react with the soluble silicate species and form insoluble silicate precipitates.

As aforementioned, the hardness of water is generally defined as the total concentration of calcium and magnesium ions and is expressed as ppm (parts per million) as $CaCO_3$ Total Hardness. Although "hard water" is generally defined as water having greater than 120 ppm as $CaCO_3$ Total Hardness, the silicate-protecting agents present in the instant invention are beneficially employed when any detrimental concentration of cations are present such that the concentration of soluble silicate in the working antifreeze would be reduced thereby and, e.g., are advantageously employed in working antifreeze compositions formed with water containing greater than about 50 ppm $CaCO_3$ Total Hardness. Based upon available information, it is believed that the majority of the cities in the United States have water containing between about 50 ppm and about 300 ppm $CaCO_3$ Total Hardness.

For the purpose of this invention, the advantageous use of an alkane tetracarboxylic acid, preferably a 1, 2, 3, 4-alkane tetracarboxylic acid or derivative thereof, occurs when a detrimetal concentration of hard water cations is present in either the antifreeze concentrate or the working antifreeze. As aforementioned, a detrimental concentration of hard water cations is a concentration that decreases the concentration of soluble silicate in the working antifreeze. The addition of a 1, 2, 3, 4-alkane tetracarboxylic acid to the antifreeze concentrate is beneficial in that minor amounts of water are typically present in the antifreeze concentrate and such water may contain hard water cations. Further, hard water cations may also be present in the antifreeze concentrate as an impurity from extraneous sources other than any water component.

In general, the antifreeze composition concentrate of the instant invention comprises an alcohol, a buffer in an amount to maintain the selected pH of the antifreeze, a silicate in an effective corrosion-inhibiting amount and a 1,2,3,4-alkane tetracarboxylic acid or derivative thereof in an effective silicate-protecting amount.

The instant invention provides a silicate-containing antifreeze concentrate having improved protection for the soluble silicate component against cations commonly found in hard water. Since the silicate-containing antifreeze composition concentrate will typically contain minor amounts of water, e.g., up to about 10% by weight, and, since this may contain hard water cations it is beneficial to have the tetracarboxylic acid present in the antifreeze concentrate. The instant invention employs a tetra n-alkane carboxylic acid, e.g., a 1,2,3,4-alkane tetracarboxylic acid, as a silicate-protecting agent which preferentially binds hard water cations, i.e., has a greater affinity for hard water cations than the silicate species present in the antifreeze composition concentrate and the soluble silicate species in the working antifreeze.

The silicate-protecting agent employed herein is generally referred to herein by the acronym as "ATCA" (Alkane Tetra Carboxylic Acid) and is preferably at least one member selected from the group consisting of 1, 2, 3, 4-alkane tetracarboxylic acid and the derivatives thereof, e.g., the esters, anhydrides and salts of the aforementioned. The "alkane" may be any normal or branched alkane having at least four continuous carbon atoms in a straight chain whereby an alkane tetracarboxylic acid may be formed. The alkane is preferably a normal alkane. Representative of the "alkane" include butane, pentane, hexane, heptane, octane and nonane, with the preferred alkane believed to be butane. It is believed that the lower alkanes are preferred owing to decreasing solubility of the acids or acid derivatives in alcohol and alcohol/water mixtures with the increasing number of carbon atoms in the "alkane" of the alkane tetracarboxylic acid and its derivatives. As aforementioned, the silicate-protecting agent employed herein is preferably at least one member selected from the group consisting of 1, 2, 3, 4-alkane tetracarboxylic acid and salts of the acid, ester and anhydride of a 1, 2, 3, 4 alkane tetracarboxylic acid and salts of the anhydride of 1, 2, 3, 4-alkane tetracarboxylic acid. The salts employed herein are water soluble so as to provide an effective amount of the ATCA component and include the alkali metal salts, quaternary ammonium salts. The preferred form of the ATCA component is tetracarboxylic acid or salt thereof owing to the belief that the acid or acid salt form is most effective in preferentially reacting with hard water cations. When the ATCA component is an anhydride of an alkane tetracarboxylic acid it has been observed that the anhydride should be hydrolyzed by acid or base, e.g., saponified, or subjected to heat so as to form the acid or salt form of the alkane tetracarboxylic acid. This may be done D situ or prior to addition of the ATCA component, e.g., anhydride or ester, to the antifreeze concentrate or working antifreeze.

It has also been observed that the ATCA component is not only effective in decreasing the insolubilizing effects of hard water cations on soluble silicate species, but also provides this benefit without interfering with the corrosion inhibiting characteristics of the working antifreeze composition for the metals present in automotive cooling systems. Surprisingly, the ATCA component is not itself a corrosive component. This substantially non-corrosive characteristic of the ATCA component is quite unexpected in view of the heretobefore observed corrosiveness of chelating agents such as EDTA.

The ATCA component employed in the composition of this invention is present in an "effective silicate-protecting amount". The term "an effective silicate-protecting amount" is employed herein to mean an amount of ATCA which when present in the working antifreeze results in an increase of the concentration of soluble silicate species in the working antifreeze compositon compared to the same antifreeze composition sans the ATCA component, i.e., a "silicate-protecting amount" of ATCA provides an increase in the corrosion inhibiting amount of soluble silicate in the working antifreeze by preferentially reacting with cations which otherwise would have been associated with and, thus, decreased the concentration of the soluble silicate species. The ATCA component is generally employed in an amount of from about 0.001% to about 0.25% by weight based upon the weight of the antifreeze concentrate and more typically employed in an amount from about 0.01 to about 0.15 weight percent. The actual effective silicate-protecting amount will depend on the components of the final working antifreeze and the nature and amount of the cations present in the working antifreeze.

The preferred ATCA component, owing to its observed effectiveness and commercial availability, is 1, 2, 3, 4-butane tetracarboxylic acid, since the acid or the salt form of the acid is believed to be the active silicate-protecting species. It has been observed that when the anhydride of 1, 2, 3, 4-butane tetracarboxylic acid is employed as the silicate-protecting agent that its ability to protect the soluble silicate species at room temperature is less than that obtained by use of 1, 2, 3, 4-butane tetracarboxylic acid or a salt thereof. The anhydride is beneficially saponified prior to use or heated D situ, in the working antifreeze to form the acid or salt form if optimum silicate protection is desired at ambient temperatures. Of course, during use the temperature of the working antifreeze will be greater than ambient temperature and will normally be sufficient to convert a major amount of an anhydride or ester to the acid or acid salt form, since it has been observed that at 100° C. the anhydride in an aqueous mixture is essentially completely converted to the acid or acid salt form.

The above-described antifreeze concentrate may contain between about 0.1% and about 10% by weight or higher amount of water, based upon the weight of the antifreeze concentrate, as a result of water present in the various components employed to form the antifreeze concentrate. The antifreeze concentrate is typically used in an automotive cooling system by thereafter being diluted by addition of from about 10% to about 90% by weight water, based upon the weight of the antifreeze concentrate, to form a working antifreeze composition suitable for introduction into an automotive cooling system.

The alcohol employed in the composition of this invention may be any alcohol or heat transfer medium capable of use as a heat transfer fluid and preferably is at least one alcohol selected from the group consisting of methanol, ethanol, propanol, ethylene glycol, diethylene glycol, triethylene glycol, propylene glycol, dipropylene glycol, butylene glycol, glycerol, the monoethylether of glycerol, the dimethylether of glycerol, alkoxy alkanols (such as methoxyethanol) and mixtures thereof. The preferred alcohol is selected from the group consisting of ethylene glycol, diethylene glycol, propylene glycol, dipropylene glycol and mixtures thereof.

The useful buffers may be any of the many that are known and described for use in antifreeze compositions. The particular buffer or mixtures of buffers used will depend upon the selected pH for the working antifreeze which, in turn, may be a function of the particular metals used in construction of the automotive cooling system. The ATCA component is particularly advantageous in antifreeze compositions that contain essentially no phosphate or wherein phosphate is a minor component in the buffer component, since phosphate may act as both a buffer and has been observed to act as a binding species for calcium to form insoluble calcium phosphate. Accordingly, in one embodiment the buffer comprises a borate essentially in the absence of phosphate.

Both the antifreeze concentrate and the aqueous working antifreeze composition typically have a pH between about 7 and about 12, preferably between about 8 and about 11.

When measured on a 50:50 volume/volume basis of antifreeze concentrate and water (the composition generally recommended for a working antifreeze), the pH will preferably be maintained between a level of about 8 and about 11. Below a pH of about 8, the antifreeze would generally be expected to be unduly corrosive to ferrous metals. On the other hand, utilizing a working pH of more than about 11 would be expected to promote relatively high levels of aluminum corrosion and aluminum transport deposits in a radiator. In accordance with the present invention, it is preferred, when utilizing the 50:50 volume to volume mixture of the antifreeze concentrate and water, to employ a pH within the range of from about 8 to about 1, more preferably between about 9 and about 10.5. When optimizing the system to favor minimized corrosiveness toward amphoteric metals and to minimize aluminum transport deposition in a cooling system including such metals, a pH within the range of from about 9 to about 10.5 will typically be selected.

Representative examples of buffers commonly employed in antifreeze compositions include ammonium, alkanolamine and alkali metal borates, tetraalkyl and tetraaryl-ammonium borates and borate mixtures thereof; alkali metal phosphates; ammonium phosphates, alkanolamine phosphates, and tetraalkyl-phosphates, alkanolamine phosphates, and tetraalkyl- and tetraaryl-ammonium phosphates, and phosphate mixtures thereof; alkali metal, ammonium, and amine, benzoates and substituted benzoates; mono basic acids and salts of mono basic acids; salts of the dibasic acids, such as glutaric acid, sebacic acid and azelaic acids, having 6 to 20 carbons, and mixtures thereof; and mixtures of any of the above buffers. The buffer is generally present in an amount of between 1 and about 5 wt. percent, based on the weight of the antifreeze concentrate.

Among the useful buffers identified, a borate or a mixture of borates essentially in the absence of phosphate is the preferred buffer for use with the ATCA component and may be conveniently added as the alkali metal salt. After adding the borate salt, addition of sodium hydroxide or a mixture of boric acid and sodium hydroxide can be used to provide metaborates and/or tetraborates in the antifreeze concentrate. The buffer provides the desired selected or working pH and capacity ("Reserve Alkalinity") for maintaining this pH during extended use of the working antifreeze when the pH would otherwise change due to changes in the compositions of the antifreeze over time.

The silicate component useful in antifreezes include inorganic silicates and organic silicates. Useful inorganic silicates are represented by the empirical formula:

where M is a monovalent cation that forms a glycol soluble silicate selected from the group consisting of sodium, potassium, lithium, rubidium and tetraorganoammonium cations and where w has a value of from 1 to 4 inclusive, v has a value from 0 to 3 inclusive and p has a value from 1 to 4 inclusive which is equal to the sum of w and Y.

Useful organic silicates are the esters encompassed by the formula:

wherein R is selected from the group consisting of alkyl, aryl, alkoxyalkyl, alkoxyaryl, hydroxyalkoxy, and mixtures thereof. In use, when diluted with water, it is believed that such esters will form smaller silicate aggregates, which in turn have a greater proficiency in inhibition of metal corrosion as compared to the inorganic silicates.

As illustrative examples of useful inorganic silicates, potassium and sodium silicates are appropriate. Useful organic silicate esters include: alkyl silicates such as methyl silicate, ethyl silicate, butyl silicate and amylsilicates; aryl silicates such as benzyl and tolyl silicates; mixed alkyl silicates such as methyl ethyl silicate; mixed aryl silicates such as benzyl tolyl silicate; mixed alkyl aryl silicates such as methyl benzyl silicate and ethyl tolyl silicate; glycol silicates such as hydroxyethyl glycol silicate and hydroxypropyl glycol silicate; and polyhydroxy alcohol silicates such as glycerol silicate and pentaerythritol silicate; oxyalkylene silicates such as methoxy diethylene glycol silicate, i.e. METHYL CARBITOL (Trademark of Union Carbide Corporation, Danbury, Conn.) silicate; and mixtures of the above. In one embodiment the organic silicate is tetrahydroxy-ethoxy orthosilicate. Also useful within the scope of the present invention is the well-known class of partially condensed orthosilicate esters.

The amount of silicate in the concentrates used to make the working antifreezes of this invention can vary over a wide range, as has been discussed, but is preferably present in an amount of between 100 and 700 ppm of equivalent Si, more preferably in an amount between 300 and 500 ppm. Below 100 ppm, insufficient silicate would generally be provided to minimize metal corrosion in an automotive cooling system, whereas above 700 ppm, silicate gels may be encountered in the antifreeze concentrate. Gelation is undesirable because the silicates in the gel are not available to protect the metal surfaces of the automotive cooling system but rather are aggregated in the gel itself.

The silicate component may also be a copolymer such as the phosphonate-silicate, sulfonate-silicate, carboxylate-silicate and siloxane-silicate copolymers heretofore employed in the prior art in silicate-containing antifreeze compositions. These copolymers may be preformed or can be formed in situ upon combination of a water-soluble silicate and a water-soluble phosphonate, sulfonate, or siloxane in an aqueous system at ambient temperature, i.e., an organosilicon compound. These copolymers are generally referred to as "siloxane-silicate" copolymers in that each contains silicon in addition to the phosphonate, sulfonate, carboxylate, etc., moiety. These copolymers are believed to provide improved metal corrosion inhibition over the use of the simple water-soluble silicates, since the siloxane-silicate copolymers substantially inhibit the gelation tendency of water-soluble silicates at a pH of between about 7 and about 11. The anticorrosive activity of the soluble silicate is better maintained in the siloxane-silicate copolymer as compared to an ordinary soluble silicate, such as sodium silicate, in both the concentrate and the working antifreeze. Siloxane-silicate copolymers which can be utilized herein include, but are not limited to, those disclosed in U.S. Pat. Nos. 3,341,469; 3,337,496; 3,312,622; 3,198,820; 3,203,969; 3,248,329, 4,629,602, 4,701,277 and 4,772,408, all incorporated herein by reference, and include the phosphonate-siloxane-silicate, sulfonate-siloxane-silicate copolymers and carboxylate-siloxane-silicate copolymers.

The siloxane-silicate copolymer useful in stabilizing silicate is generally employed in an amount of from about 0.01% to about 10% by weight, based upon the weight of the antifreeze concentrate, more preferably from about 0.02 weight percent to about 5 weight percent, most preferably from about 0.02 weight percent to about 2 weight percent, based on the weight of the antifreeze concentrate. Below about 0.01 wt. %, the amount of siloxane-silicate copolymer is expected to be less protective to metals than desired, whereas above about 10 wt.%, the cost of the siloxane-silicate becomes excessive without commensurate improvement in metal corrosion.

Siloxane-silicate copolymers useful in the present invention can be formed D situ in the antifreeze formulation by mixing organosilanes with silicates in the presence of the alcohol being employed. The process of making siloxane-silicate copolymers is well known in the art and is disclosed, for example, in U.S. Pat. No. 3,337,496. Siloxane-silicate copolymers comprising 0.1 to 40 parts by weight of siloxane and 60 to 99.9 parts by weight of silicate have been found to be useful in antifreeze compositions, said parts by weight being based upon silicon equivalents.

Optional additives may be employed in minor amounts of less than five (5) weight percent, based on the weight of the aqueous working antifreeze composition. Typical optional additives which may be added include, tungstates, selenates, chromates, hydroxides, carbonates, bicarbonates, sebacates and other suitable organic acids (including dicarboxylic acids), molybdates, borates, phosphates, hydrogen phosphates, benzoates, hydroxy benzoates or acids thereof, silicones, alkali metal nitrates, alkali metal nitrites, azoles, e.g., tolyltriazole, mercaptobenzothiazole, benzotriazole, and the like, or mixtures thereof. Other typical optional additives would include wetting agents and surfactants such as, for example, known ionic and non-ionic surfactants such as the poly (oxyalkylene) adducts of fatty alcohols; antifoams and/or lubricants such as the well-known polysiloxanes and the polyoxyalkylene glycols, as well as any other minor ingredients known in the antifreeze art.

If one or more of the known inhibitors are employed together with the silicate inhibitor, the sum total of all inhibitors should be used in an "inhibitory effective amount", i.e., an amount sufficient to provide some corrosion inhibition with respect to the metal surfaces to be protected. The following examples are merely illustrative of, and are not intended to limit, the present invention.

EXAMPLE 1

This example demonstrates the effect of $Ca^{+2}$ cations (a cation present in "hard water") on the stability of soluble silicate species. Four siloxane-silicate-containing antifreeze compositions were prepared by diluting a borate buffered antifreeze concentrate (Antifreeze Composition "B" in Example 3 (a), infra) with 50 weight percent water using four different water samples containing the following $Ca^{+2}$ concentrations: 0, 25, 50 and 100 ppm $Ca^{+2}$ (added as calcium acetate), respectively. The percent (%) Silicate Lost for each sample was determined by determining the initial soluble silicate in the sample prepared with water containing 0 ppm $Ca^{+2}$ and calculating the difference in soluble silicate after each sample was evaluated by the following procedure. The samples containing 25, 50 and 100 ppm $Ca^{+2}$ were each evaluated by permitting each sample to sit for two days at 80° C. with air bubbled through the sample. The precipitate formed after this period was removed by filtration and the soluble silicate in the sample measured. The % Silicate Lost for the sample is calculated as the difference between the initial silicate for the 0 ppm $Ca^{+2}$ sample and the final measured soluble silicate for the sample, divided by the initial silicate concentration times 100.

The % Silicate Lost for each sample was as follows:

| Sample No. | ppm $Ca^{+2}$ | % Silicate Lost |
|---|---|---|
| 1 | 0 | 0 |
| 2 | 25 | 64 |
| 3 | 50 | 68 |
| 4 | 100 | 73 |

The above results demonstrate the dramatic effect which the $Ca^{+2}$ cations had on the solubility of the silicate species in the working antifreeze composition. At a $Ca^{+2}$ concentration as low as 25 ppm the percent of soluble silicate lost from the working antifreeze was 64 percent by weight.

EXAMPLE 2

Samples were prepared in triplicate using three ASTM water samples containing 0 ppm, 50 ppm and 100 ppm $Ca^+$, added as calcium acetate and the antifreeze composition of Example 3(a) to provide 50 weight percent antifreeze mixtures. The samples were evaluated by storing each sample at room temperature (RT) or at 100° C. for 48 hours. The samples were then analyzed for $Ca^{+2}$ and silicate. These three samples were used to evaluate several compounds to determine their relative effectiveness as silicate-protecting agents. As shown by the following experimental results, the ability to act as a complexing agent in aqueous media is not alone a sufficient criteria so as to qualify a compound as a suitable silicate-protecting agent for addition to a silicate-containing antifreeze composition. Further, some compounds may demonstrate some level of silicate-protecting effectiveness at lower $Ca^{+2}$ concentrations and not at the higher concentrations above about 100 ppm, commonly found in hard water. Further, some compounds may provide minimal protection for the soluble silicate but may also be corrosive to the metals commonly encountered in automotive cooling systems. For example, although EDTA (ethylene diamine tetraacetic acid) is an excellent chelating agent for many cations it is not a suitable silicate-protecting agent owing to its corrosive effect on the metals present in automotive cooling systems. In fact, the ability of a compound to act as a chelating agent for hard water cations has heretofore generally been an indication that the compound will be corrosive to the metals present in automotive cooling systems.

The following compounds were tested according to the procedure of Example 2 with the same test siloxane-silicate-containing antifreeze employed in Example 1, except each compound was evaluated at the indicated concentration. The concentration for each compound was selected to provide the same equivalents of chelating capacity for $Ca^{+2}$ cations for the selected compound which is present in each working antifreeze. The results of these tests were as follows:

| Compound | Initial $Ca^{+2}$ (ppm) | Final $Ca^{+2}$ | Final $Si^1$ | Si loss[2] | % Si loss[3] |
|---|---|---|---|---|---|
| None (Control) | 0 | 0 | 284 | — | — |
| | 50 | 21 | 126 | 158 | 56 |
| | 100 | 52 | 80 | 204 | 72 |
| 0.0675 wt % EDTA | 0 | 0 | 193 | — | — |
| | 50 | 45 | 185 | 99 | 34 |
| | 100 | 59 | 148 | 136 | 48 |
| 0.841 wt % Citric Acid | 0 | 0 | 294 | — | — |
| | 50 | 44 | 125 | 159 | 56 |
| | 100 | 92 | 107 | 177 | 62 |
| 0.0451 Wt % 1-hydroxy-ethylidene-diphosphonic acid | 0 | 0 | 289 | — | — |
| | 50 | 0 | 286 | 0 | 0 |
| | 100 | 13 | 148 | 136 | 47 |
| 0.1023 Wt % BTCA | 0 | 0 | 292 | — | — |
| | 50 | 4 | 299 | 0 | 0 |
| | 100 | 4 | 279 | 0 | 0 |
| 0.0692 Wt % phenyl phosphonate | 0 | 0 | 286 | — | — |
| | 5 | 33 | 105 | 179 | 63 |
| | 100 | 41 | 99 | 185 | 65 |

[1] Concentration in micrograms/milliliters in the starting solution.
[2] Si loss (concentration in micrograms/milliliters) = (Total concentration in micrograms/milliliters Si with 0 ppm $Ca^{+2}$ of Control)-(Total concentration in micrograms/milliliters Si for that sample).
[3] % Si loss = ((concentration in micrograms/milliliters of Si loss)/(Total concentration in micrograms/milliliters Si with 0 ppm $Ca^{+2}$ of Control)) · 100.

As demonstrated by the above tests, when employed in the same silicate-containing antifreeze composition, the use of ATCA (1, 2, 3, 4-alkane tetracarboxylic acid) was extremely effective in protecting soluble silicate species from attack by $Ca^{+2}$ cations present at 100 ppm with essentially all soluble silicate species remaining soluble in the 100 ppm $ca^{+2}$-containing working antifreeze. Further, although some effectiveness for protecting soluble silicate species is observed for other of the compounds tested, it has also been observed that these compounds are more corrosive to the metals present in automotive cooling systems than BTCA.

EXAMPLE 3

(a) Two antifreeze concentrates were prepared having the following compositions:

| Ingredients | ANTIFREEZE COMPOSITIONS (Wt. % of Each Ingredient) | |
|---|---|---|
| | A | B |
| Ethylene Glycol | 95.1070 | 95.0285 |
| $Na_2B_4O_7.5H_2O$ | 0.3975 | 2.0124 |
| $H_3PO_4$, 75% aqueous | 0.6602 | — |
| NaOH, 50% aqueous | 1.0411 | 0.9616 |
| Sodium Silicate, 40 Clear[1] | 0.2930 | 0.3662 |
| Silane[2] | A-1 | B-1 |
| Sebacic Acid | — | 0.1643 |
| NaOH, 50% | — | 0.1300 |
| $NaNO_3$, 40% aqueous | 0.5000 | 0.5000 |
| Sodium tolyltriazole, 50% aqueous | 0.1165 | 0.2500 |
| Dye | 0.0016 | 0.0016 |
| Antifoam[3] | 0.4400 | 0.3400 |
| pH (33 vol % aqueous) | 10.5 | 10.0 |
| RA (ASTM D-3306) | 13.6 | 30.3 |

[1] A liquid sodium silicate product of Diamond Shamrock Corporation having a solids content of 38.3 wt. % and manufactured for uses requiring high clarity.
[2] (a) Silane A-1 is a silicone stabilizer disclosed in U.S. Pat. Nos. 3,337,496 and 3,341,469 and having the formula:
$CH_3O(CH_2CH_2O)_mC_3H_6Si(OCH_3)_3$
where m has an average value of 7.2.
(b) Silane B-1 is a saponified $(CH_3O)_3Si(CH_2)_{10}COOH$.
[3] An antifoam comprising a polypropylene glycol.

The antifreeze compositions A and B were prepared by adding the silane as a pre-saponified silane according to the procedure set forth in Example 1 of U.S. Pat. No. 4,701,277, incorporated herein by reference.

(b) The general evaluation procedure of Example 2 was repeated using water samples containing three different $Ca^{+2}$ concentrations (selected to correspond to $Ca^{+2}$ concentrations typically found in city water supplies) and was conducted at room temperature (RT) and at 100° C.

| Antifreeze Concentrate | Temp. | Initial $Ca^{+2}$ (ppm) | Final $Si^1$ | Si loss[2] | % Si loss[3] |
|---|---|---|---|---|---|
| A | RT | 0 | 250 | 0 | 0 |
| A | RT | 35 | 224 | 26 | 10 |
| A | RT | 80 | 208 | 42 | 17 |
| A | 100° C. | 0 | 241 | 9 | 4 |
| A | 100° C. | 35 | 187 | 63 | 25 |
| A | 100° C. | 80 | 167 | 83 | 33 |
| B | RT | 0 | 290 | 0 | 0 |
| B | RT | 35 | 290 | 0 | 0 |
| B | RT | 80 | 288 | 2 | 1 |
| B | 100° C. | 0 | 206 | 84 | 29 |
| B | 100° C. | 35 | 152 | 138 | 48 |
| B | 100° C. | 80 | 113 | 177 | 61 |

[1] Concentration in micrograms/milliliters in the starting solution.
[2] Si loss (concentration in micrograms/milliliters) = (Total concentration in micrograms/milliliters Si with 0 ppm $Ca^{+2}$) - (Total concentration in micrograms/milliliters Si for that sample).
[3] Si loss = ((concentration in micrograms/milliliters of Si loss)/(Total concentration in micrograms/milliliters Si with 0 ppm $Ca^{+2}$)) × 100.

The above results demonstrate the significant effect that $Ca^{+2}$ cations have in decreasing the concentration of soluble silicate in both phosphate/borate and borate buffered antifreeze compositions. Although both antifreeze compositions demonstrate significant silicate sensitivity to cations at 100° C., the borate buffered antifreeze was acutely affected by $Ca^{+2}$ cations owing to the absence of phosphate which may act as both a buffer and as an agent to bind $Ca^{+2}$ cations present in the working antifreeze to form insoluble calcium phosphate.

EXAMPLE 4

This example demonstrates the significant improvement achieved in maintaining silicate as soluble silicate in working antifreeze compositions corrosion inhibition in a borate buffered antifreeze composition (Antifreeze Composition designated in Example 3(a) as Antifreeze Composition B) formed using hard water and containing 1,2,3,4-butane tetracarboxylic acid. Four samples were prepared as follows:

SAMPLE I: Antifreeze diluted with 50% vol % ASTM water (O ppm $Ca^{+2}$).

SAMPLE II: Antifreeze diluted with 50 vol % ASTM water (O ppm $Ca^{+2}$) with 0.0389 wt. % 1, 2, 3, 4-butane tetracarboxylic acid added.

SAMPLE III: Antifreeze diluted with 50 vol % ASTM water containing 150 ppm $Ca^{+2}$ (added as calcium acetate).

SAMPLE IV: Antifreeze diluted with 50 vol % ASTM water containing 150 ppm $Ca^{+2}$ (added as calcium acetate) with 0.0389 wt. % 1, 2, 3, 4-butane tetracarboxylic acid added.

The four samples were each tested using a standard metal disc test with a cold finger. This is a standard test method used in the antifreeze industry to determine the corrosion inhibitory effect of a formulated antifreeze composition with respect to heat rejecting metal surfaces. The test method was carried out for both an aluminum and an iron metal disc. This test method is described in Corrosion, 15, 257t at 258t (1959) "Laboratory Methods for Determining Corrosion Rates Under Heat Flux Conditions", and also in an ASTM publication entitled, "Engine Coolant Testing: State of the Art," a symposium sponsored by ASTM Committee D-15, at pages 17–19 (printed, May 1980), both incorporated herein by reference.

The following summarizes the test equipment and procedure used:

The apparatus consisted of a one liter flask, fitted with a condenser, a thermometer, a cold finger, a temperature controller, a 1½ inch diameter × ¼ inch thick No. 319 aluminum casting alloy (herein the "aluminum disc") or No. SAE G-3500 Automotive Gray cast iron (herein the "cast iron disc), and an electric heater source.

The apparatus was charged with 750 ml. of the water-diluted antifreeze solution (50% solution or 50:50 volume to volume antifreeze/water) and heated to effect boiling at the aluminum disc or cast iron disc surface at a solution temperature maintained at 85° C. for 168 hours.

Figure 1:
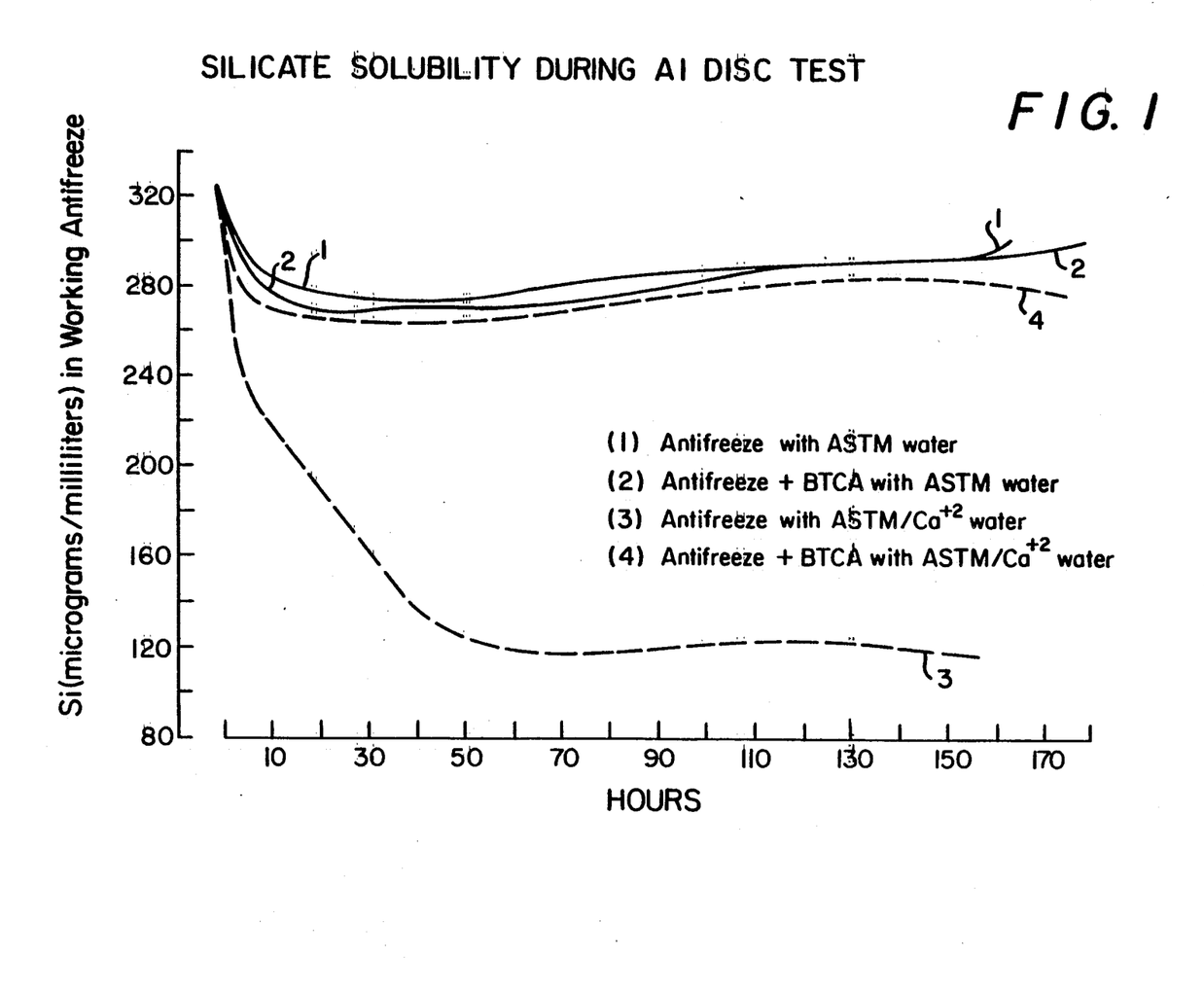
FIG. 1 shows the beneficial effect of an alkane tetracarboxylic acid on silicate stability in an aluminum disc test.
Figure 2:
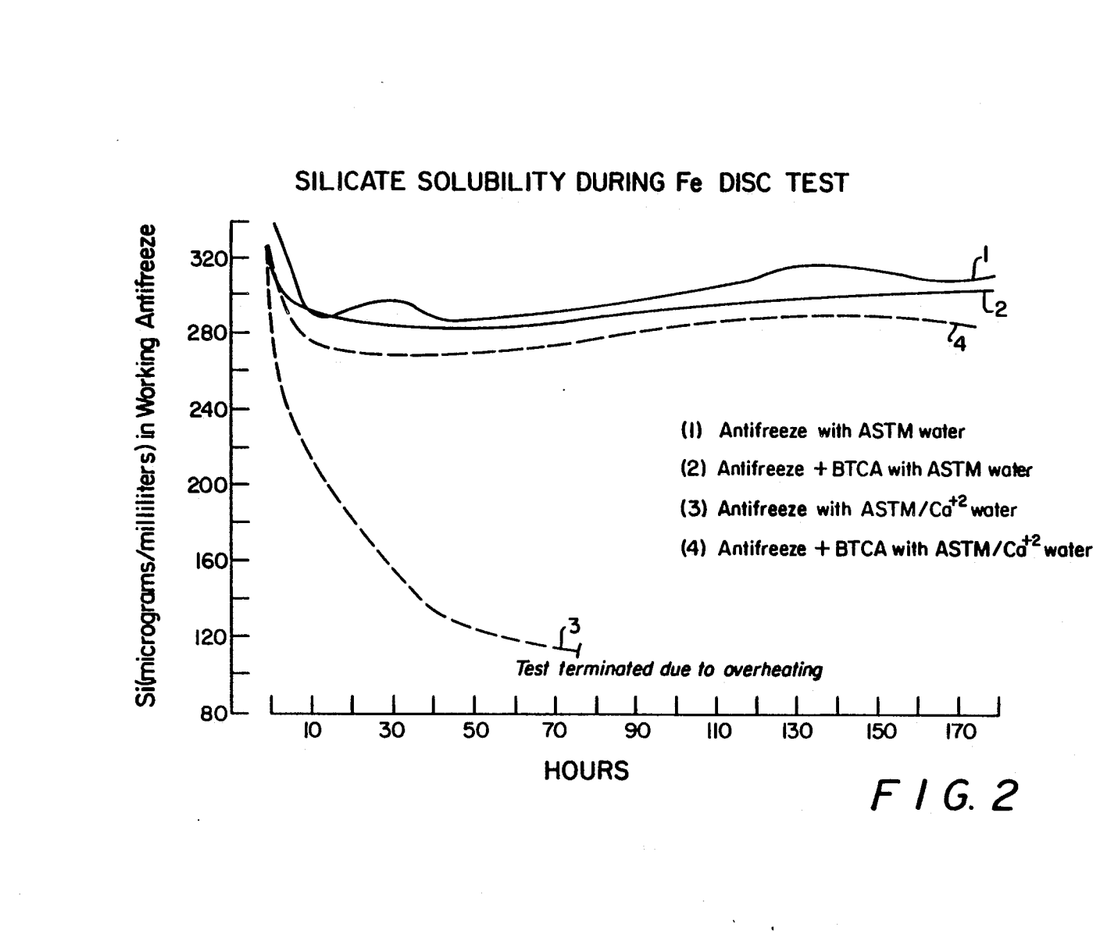
FIG. 2 shows the beneficial effect of an alkane tetracarboxylic acid on silicate stability in an iron disc test.

Samples were taken from the test solutions and the concentration (micrograms/milliliter) of soluble silicate species were measured for the 168 hour test period. FIG. 1 shows the results for the test solutions employed for the aluminum disc test, and FIG. 2 shows the results for the iron disc tests. Both figures show the significant effect of the 1,2,3,4-butane tetracarboxylic acid on the concentration of soluble silicate, i.e., effect on silicate stability, as a function of $Ca^{+2}$ cations in a borate buffered (in the absence of phosphate) antifreeze composition. In addition, FIG. 2 shows the overheating effect which results from the formation of precipitate deposition and the overheating that results from scale formation on the heat transfer surfaces when $Ca^{+2}$ cations result in the formation of insoluble silicate precipitates.

The results of the tests depicted in FIG. 1 and FIG. 2 are as follows:

| Sample No. | $Ca^{+2}$ ppm | Metal Tested | Metal Temp. (Degree F (a)) |
|---|---|---|---|
| 1 | 0 | Al | 235 |
| 2 | 0 | Al | 242 |
| 3 | 150 | Al | 267 (b) |
| 4 | 150 | Al | 310 |
| 1 | 0 | Fe | 290 |
| 2 | 0 | Fe | 262 |
| 3 | 150 | Fe | 600+ (c) |
| 4 | 150 | Fe | 330 |

(a) Metal temperatures on day seven of test.
(b) Temperatures of over 600 degrees F were recorded earlier in the test.
(c) Test was terminated on day three of the test due to prolonged excessive temperature, 600+ degrees F.

EXAMPLE 5

The procedure of example 2 was repeated to evaluate the anhydride of 1,2,3,4-butane tetracarboxylic acid ("BTCAA") as a silicate-protecting agent. An antifreeze concentrate was prepared having a composition similar to Antifreeze Composition B of Example 3, above, except sebacic acid was replaced by dodecanedoic acid. The BTCAA component was employed in place of BTCA and was present in a concentration of 0.034 wt. %. The antifreeze was aged for 48 hours at 130° F. before evaluation. The ppm $Ca^{+2}$ and soluble Si present in vol. % solutions prepared with water containing 0 ppm, 100 ppm and 200 ppm $Ca^{+2}$ were evaluated (in triplicate) at 100° C. and gave the following results:

| Sample No. 1 | ppm $Ca^{+2}$ (added) | Measured ppm $Ca^{+2}$ (50 vol %) | Measured Soluble Si[1] |
|---|---|---|---|
| 1 | 0 | 0 | 171 |
| 2 | 0 | 0 | 163 |
| 3 | 0 | 0 | 166 |
| 4 | 100 | 6.50 | 185 |
| 5 | 100 | 6.66 | 185 |
| 6 | 100 | 7.84 | 192 |
| 7 | 200 | 12.90 | 168 |
| 8 | 200 | 13.20 | 171 |
| 9 | 200 | 14.50 | 164 |

The above results, when compared to the effects of $Ca^{+2}$-containing water demonstrated in Examples 1, 2, 3 and 4, demonstrate the effectiveness of BTCAA as a silicate-protecting agent. As aforementioned, it is believed that a pre-saponification or heating to about 100° C. is beneficial to convert the BTCAA to BTCA or a salt of BTCA, since these are believed to be the most active forms of the ATCA silicate-protecting agent.

I claim:

1. An antifreeze concentrate having a selected pH comprising:
    (a) an alcohol; the selected pH;
    (c) a silicate in an effective corrosion-inhibiting amount; and
    (d) an 1,2,3,4 alkane tetracarboxylic acid silicate-protecting agent in an effective silicate-protecting amount.

2. An antifreeze concentrate according to claim 1 wherein the silicate-protecting agent is at least one silicate-protecting agent selected from the group consisting of 1,2,3,4-alkane tetracarboxylic acids, the esters, anhydrides and salts of 1, 2, 3, 4-alkane tetracarboxylic acids.

3. An antifreeze concentrate according to claim 1 wherein the alkane of the silicate-protecting agent is selected from the group consisting of butane, pentane, hexane, heptane, octane and mixtures thereof.

4. An antifreeze concentrate according to claim 2 wherein the silicate-protecting agent is selected from the group consisting of 1,2,3,4-butane tetracarboxylic acid, water soluble salts of 1,2,3,4-butane tetracarboxylic acid, the esters or anhydride of 1, 2, 3, 4-butane tetracarboxylic acid, water soluble salts of the hydrolyzed esters or the anhydride of 1,2,3,4-butane tetracarboxylic acid and mixtures thereof.

5. An antifreeze concentrate according to claim 4 wherein the silicate-protecting agent is selected from the group consisting of 1,2,3,4-butane tetracarboxylic acid, salts of 1,2,3,4-butane, tetracarboxylic acid, and mixtures thereof.

6. An antifreeze concentrate according to claim 4 wherein the silicate-protecting agent is selected from the group consisting of the esters and the anhydride of 1,2,3,4-butane tetracarboxylic acid, salts of the hydrolyzed esters and the anhydride of 1,2,3,4-butane tetracarboxylic acid and mixtures thereof.

7. An antifreeze concentrate according to claim 2 wherein the salt is selected from the group consisting of alkali metal salts, quaternary ammonium salts and mixtures thereof.

8. An antifreeze concentrate according to claim 1 or claim 4 wherein the $CaCO_3$ Total Hardness present therein is in an amount greater than about 50 ppm.

9. The antifreeze concentrate of claim 1 or claim 4 wherein said buffer is borate in the absence of phosphate.

10. The antifreeze concentrate of claim 1 wherein said buffer is selected from the group consisting of borates, phosphates, benzoates, dibasic acids and mixtures thereof.

11. The antifreeze concentrate of claim 10 wherein the silicate is a siloxane-silicate copolymer.

12. The antifreeze concentrate of claim 1 or claim 4 wherein the selected pH is between about 8 and about 11.

13. The antifreeze concentrate of claim 1 wherein the alcohol is selected from the group consisting of ethylene glycol, diethylene glycol, propylene glycol, dipropylene glycol and mixtures thereof.

14. The antifreeze concentrate of claim 1 wherein the effective silicate-protecting amount of the silicate-protecting agent is between about 0.001 and about 0.25 wt. percent based upon the weight of said antifreeze concentrate.

15. An antifreeze concentrate having a selected pH comprising:
    (I) an alcohol;
    (II) a borate buffer substantially in the absence of phosphate;
    (III) a siloxane-silicate copolymer present in an amount of from 0.01 percent to 10 percent by weight based upon the weight of said antifreeze concentrate; and
    (IV) a silicate-protecting agent present in an effective silicate-protecting amount between about 0.001 percent by weight and about 0.25 percent by weight and selected from the group consisting of 1, 2, 3, 4-butane tetracarboxylic acid, salts of 1, 2, 3, 4-butane tetracarboxylic acid, the esters and the anhydride of 1, 2, 3, 4-butane tetracarboxylic acid, the salts of the hydrolyzed esters and anhydride of 1, 2, 3, 4-butane tetracarboxylic acid and mixtures thereof.

16. The antifreeze concentrate of claim 15 wherein said borate buffer is an alkali metal borate and the selected pH of the antifreeze concentrate is between about 8 and about 11.

17. The antifreeze concentrate of claim 15 wherein the silicate-protecting agent is 1, 2, 3, 4-butane tetracarboxylic acid.

18. The antifreeze concentrate of claim 17 wherein said 1, 2, 3, 4-butane tetracarboxylic acid is present in an effective silicate-protecting amount between about 0.01 percent by weight and about 0.15 percent by weight.

19. The antifreeze concentrate of claim 15 wherein the silicate-protecting agent is a water soluble salt of 1, 2, 3, 4-butane tetracarboxylic acid.

20. The antifreeze concentrate of claim 19 wherein said salt of 1, 2, 3, 4-butane tetracarboxylic acid is present in an effective silicate-protecting amount between about 0.01 percent by weight and about 0.15 percent by weight.

21. The antifreeze concentrate of claim 15 wherein said silicate-protecting agent is a salt selected from the group consisting of alkali metal salts, quaternary ammonium salts and mixtures thereof.

22. The antifreeze concentrate of claim 20 wherein said salt is a water-soluble salt selected from the group consisting of alkali metal salts, quaternary ammonium salts and mixtures thereof.

23. The antifreeze concentrate of claim 15 wherein the silicate-protecting agent is selected from the group consisting of the esters and anhydride of 1, 2, 3, 4-butane tetracarboxylic acid, salts thereof and mixtures thereof.

24. The antifreeze concentrate of claim 23 wherein said silicate-protecting agent is present in an effective silicate-protecting amount between about 0.15 weight percent and about 0.15 weight percent.

25. The antifreeze concentrate of claim 24 wherein said salt is a water soluble salt selected from the group consisting if alkali metal salts, quaternary ammonium salts and mixtures thereof.

26. The antifreeze concentrate of claim 15 wherein said siloxane-silicate copolymer is selected from the group consisting of carboxylate siloxane-silicate, phosphonate siloxane-silicate, sulfonate siloxane-silicate and mixtures thereof.

27. The antifreeze concentrate of claim 15 wherein said alcohol is selected from the group consisting of ethylene glycol, diethylene glycol, propylene glycol, dipropylene glycol and mixtures thereof.

28. The antifreeze concentrate of claim 27 wherein the pH of said concentrate is between about 8 and about 11.

29. The antifreeze concentrate of claim 28 wherein the pH is between about 9 and about 10.5.

30. The antifreeze concentrate of claim 15 wherein said antifreeze concentrate contains at least one additional component selected from the group consisting of molybdates, tungstates, selenates, chromates, hydroxides, carbonates, mono carboxylic acids and salts thereof, dicarboxylic acids and salts thereof, benzoates, silicones, alkali metal nitrates, alkali metal nitrites, azoles, wetting agents, surfactants, antifoams and lubricants.

31. A working antifreeze composition comprising:
(i) between about 10 weight percent and about 90 weight percent water containing greater than 0 ppm $CaCO_3$ Total Hardness; and
(ii) an antifreeze concentrate as claimed in claim 1.

32. A working antifreeze composition comprising:
(i) between about 10 weight percent and about 90 weight percent water containing greater than 0 ppm $CaCO_3$ Total Hardness; and
(ii) an antifreeze concentrate as claimed in claim 4.

33. A working antifreeze composition according to claim 31 or claim 32 wherein said water contains greater than about 50 ppm $CaCO_3$ Total Hardness.

34. A working antifreeze composition comprising:
(i) between about 10 weight percent and about 90 weight percent water containing greater than 0 ppm $CaCO_3$ Total Hardness; and
(ii) an antifreeze concentrate as claimed in claim 15.

35. A working antifreeze composition according to claim 34 wherein said water contains greater than about 50 ppm $CaCO_3$ Total Hardness.

36. A process for inhibiting the corrosion of metals in an automotive cooling system comprising introducing into the automobile cooling system the working antifreeze of claim 31 or claim 32 or claim 34.

* * * * *